(12) United States Patent
Mueller et al.

(10) Patent No.: US 10,836,648 B2
(45) Date of Patent: Nov. 17, 2020

(54) EX SITU FERRATE GENERATION

(71) Applicants: James Mueller, Freeport, IL (US);
Dennis Grubb, Lansdale, PA (US);
Michael Scalzi, Doylestown, PA (US)

(72) Inventors: James Mueller, Freeport, IL (US);
Dennis Grubb, Lansdale, PA (US);
Michael Scalzi, Doylestown, PA (US)

(*) Notice: Subject to any disclaimer, the term of this patent is extended or adjusted under 35 U.S.C. 154(b) by 26 days.

(21) Appl. No.: 16/299,020

(22) Filed: Mar. 11, 2019

(65) Prior Publication Data

US 2019/0276331 A1    Sep. 12, 2019

Related U.S. Application Data

(60) Provisional application No. 62/641,085, filed on Mar. 9, 2018.

(51) Int. Cl.
| | | |
|---|---|---|
| *C01G 49/00* | (2006.01) | |
| *C02F 1/66* | (2006.01) | |
| *C02F 1/72* | (2006.01) | |
| *C02F 103/06* | (2006.01) | |
| *C02F 103/10* | (2006.01) | |
| *C02F 103/00* | (2006.01) | |

(52) U.S. Cl.
CPC ............ *C01G 49/0018* (2013.01); *C02F 1/72* (2013.01); *C02F 1/66* (2013.01); *C02F 2103/008* (2013.01); *C02F 2103/06* (2013.01); *C02F 2103/10* (2013.01); *C02F 2303/02* (2013.01); *C02F 2303/04* (2013.01)

(58) Field of Classification Search
CPC ... C01G 49/0018; C01G 49/0081; C02F 1/66; C02F 1/72; C02F 2101/12; C02F 2101/305; C02F 2101/306; C02F 2101/308; C02F 2101/322; C02F 2103/008; C02F 2103/06; C02F 2103/10; C02F 2303/02; C02F 2303/04
See application file for complete search history.

(56) References Cited

U.S. PATENT DOCUMENTS

2017/0001878 A1* 1/2017 Ma ..................... C01G 49/0027

* cited by examiner

*Primary Examiner* — Lucas A Stelling
(74) *Attorney, Agent, or Firm* — Douglas J Ryder; Ryder, Mazzeo & Konieczny LLC (57) ABSTRACT

Generating ferrate ex situ by activating persulfate with BOF steel slag fines and/or ferric iron. A persulfate solution flows therethrough or thereover the BOF steel slag within, for example, a filter, fluidized bed or continuously stirred tank reactor. The ex situ generation will produce a leachate that contains multiple reactive oxidant species (ROS) such as hydrogen peroxide ($H_2O_2$), superoxide ($O2.$), sulfate radicals, hydroxyl radicals ($OH.$) and uniquely ferrate species including Fe IV, V and VI. These ROS will destroy organic compounds, sterilize, and can oxidize inorganics and a wide range of targeted contaminants in distressed water (e.g., drinking water, process water, wastewater, industrial process streams/waters, municipal process streams/waters, landfill leachate, sewage/septic systems, bilge waters, drilling fluids, mine effluents). The use of BOF steel slag avoids the need for additional pH buffers and ferrate stabilizers and is an industrial byproduct comprised of recycled materials instead of a specialized reagent.

20 Claims, 6 Drawing Sheets

| OXIDATION POTENTIALS | VOLTS |
|---|---|
| Fluorine ($F_2$) | 2.87 |
| Hydroxyl Radical (OH•) | 2.80 |
| Persulfate Radical ($SO_4$•) | 2.60 |
| Ferrate ($Fe^{+6}$) | 2.20 |
| Ozone ($O_3$) | 2.08 |
| Persulfate ($S_2O_8^{-2}$) | 2.01 |
| Hydrogen Peroxide ($H_2O_2$) | 1.78 |
| Permanganate ($MnO_4^-$) | 1.68 |
| Chlorine ($Cl_2$) | 1.49 |

FIG. 1

| PERSULFATE ACTIVATION SYSTEM | ORP (mV) |
|---|---|
| Ferric Iron ($Fe^{+3}$)/Persulfate | +742 |
| Ferrous Iron ($Fe^{+2}$)/Persulfate | +408 |
| Sodium Hydroxide/Persulfate | +251 |

FIG. 2

XRF Chemical Analysis

| Element | Wt% |
|---|---|
| Ca | 27.00 |
| Fe | 16.69 |
| Si | 7.02 |
| Mg | 6.19 |
| Mn | 2.24 |
| Ca | 1.37 |
| Al | 1.15 |
| H | 0.37 |
| P | 0.23 |
| S | 0.14 |
| Cr | 0.13 |
| Ti | 0.06 |
| V | 0.08 |
| F | 0.05 |
| Cl | 0.03 |
| Zr | 0.02 |
| K | 0.01 |
| Na | 0.01 |
| Total | 62.68 |

Normalized Elemental Composition

| | Total Sample | Amorphous Fraction | | Crystalline Fraction | |
|---|---|---|---|---|---|
| Element | Wt% | Wt% | Distribution | Wt% | Distribution |
| Ca | 43.1 | 35.5 | 29.8 | 47.3 | 70.2 |
| Fe | 26.6 | 1.0 | 1.3 | 41.1 | 98.7 |
| Si | 11.2 | 30.2 | 65.2 | 6.1 | 34.8 |
| Mg | 9.9 | 22.4 | 81.8 | 2.8 | 18.2 |
| Mn | 3.6 | 9.9 | 100.0 | 0.0 | 0.0 |
| Ca | 2.0 | 4.3 | 76.2 | 0.8 | 23.8 |
| Al | 1.3 | 3.4 | 67.7 | 0.9 | 32.3 |
| H | 0.6 | 0.0 | 0.0 | 0.9 | 100.0 |
| P | 0.4 | 1.0 | 100.0 | 0.0 | 0.0 |
| S | 0.2 | 0.6 | 100.0 | 0.0 | 0.0 |
| Cr | 0.2 | 0.5 | 100.0 | 0.0 | 0.0 |
| Ti | 0.1 | 0.3 | 100.0 | 0.0 | 0.0 |
| V | 0.1 | 0.3 | 100.0 | 0.0 | 0.0 |
| F | 0.1 | 0.2 | 100.0 | 0.0 | 0.0 |
| Cl | 0.0 | 0.1 | 100.0 | 0.0 | 0.0 |
| Zr | 0.0 | 0.1 | 100.0 | 0.0 | 0.0 |
| K | 0.0 | 0.1 | 100.0 | 0.0 | 0.0 |
| Na | 0.0 | 0.1 | 100.0 | 0.0 | 0.0 |
| Total | 100.0 | 100.0 | | 100.0 | |

Quantitative X-Ray Diffraction Analysis Compounds

| Mineral Name | Formula | Wt% |
|---|---|---|
| Amorphous Material | | 38.7 |
| Srebrodolskite | Ca2Fe2O5 | 12.1 |
| Larnite | Ca2SiO4 | 11.9 |
| Portlandite | Ca(OH)2 | 10.6 |
| Wustite | FeO | 9.1 |
| Magnesioferrite | MgFe2O4 | 8 |
| Katoite | Ca3Al2(OH)12 | 2.6 |
| Lime | CaO | 2.4 |
| Akermanite | Ca2MgSi2O7 | 1.8 |
| Vaterite | CaCO3 | 1.3 |
| Calcite | CaCO3 | 1.3 |
| Quartz | SiO2 | 0.3 |
| Total | | 100 |

Major Oxides

| Oxide | Wt% |
|---|---|
| CaO | 57.8 |
| SiO2 | 15 |
| Al2O3 | 2.2 |
| Fe2O3 | 23.9 |
| MgO | 10.3 |
| SO3 | 0.4 |
| LoI | 3.9 |

*FIG. 3*

| Chemical Name | Formula | Wt% |
|---|---|---|
| Amorphous Material | | 31.1 +/- 5 |
| Larnite | $Ca_2SiO_4$ | 20.6 +/- 5 |
| Srebrodolskite | $Ca_2Fe_2O_5$ | 10.4 +/- 3 |
| Iron Magnesium Oxide | $Fe_2MgO_4$ | 6.7 +/- 3 |
| Brownmillerite | $Ca_2(Al,Fe)_2O_5$ | 5.8 +/- 2 |
| Wuestite | $FeO$ | 5.4 +/- 2 |
| Lime | $CaO$ | 4.1 +/- 2 |
| Portlandite | $Ca(OH)_2$ | 6.5 +/- 2 |
| Periclase | | 3.1 +/- 1 |
| Magnetite | $Fe_3O_4$ | 3.0 +/- 1 |
| Mayenite | $Ca_{12}Al_{14}O_{33}$ | 2.7 +/- 1 |
| Quartz | $SiO_2$ | 0.5 aprox |

FIG. 4

| PERSULFATE ACTIVATION SYSTEM | Ferrate ($Fe^{+6}$) generated [M] |
|---|---|
| 80:20 Persulfate/Ferric Iron in DeIonized water | $<1 \times 10^{-5}$ |
| 80:20 Persulfate/Ferric Iron in buffer ($Na_2HPO_4$) | $<1 \times 10^{-5}$ |
| 80:16:4 Persulfate/Ferric Iron/BOF in DeIonized water | $2.87 \times 10^{-4}$ |
| 80:16:4 Persulfate/Ferric Iron/BOF in buffer ($Na_2HPO_4$) | $2.66 \times 10^{-4}$ |

EX SITU FERRATE GENERATION

BACKGROUND

Drinking water, process water (i.e., water resulting from various industrial processes), wastewater (i.e., water containing domestic or industrial waste, often referred to as sewage), industrial process streams and process waters, municipal process streams and process waters, landfill leachate, sewage/septic systems, bilge waters, drilling fluids, and mine effluents are often malodorous, turbid, laden with suspended solids, oily and/or include organic and inorganic contaminants. The contamination may include, for example, chlorinated solvents, petroleum hydrocarbons, halogenated volatile organic compounds (VOCs), and other halogenated compounds.

Chlorinated solvents and petroleum hydrocarbons, including polyaromatic hydrocarbons are compounds characterized by their toxicity to organisms at higher concentrations. VOCs including chlorinated aliphatic hydrocarbons (CAHs) are manmade organic compounds. They typically are manufactured from naturally occurring hydrocarbon constituents (methane, ethane, and ethene) and chlorine through various processes that substitute one or more hydrogen atoms with a chlorine atom, or selectively remove chlorine atoms from fully chlorinated hydrocarbons. CAHs are used in a wide variety of applications, including uses as solvents and degreasers and in the manufacturing of raw materials. CAHs include solvents such as tetrachloroethene (PCE), trichloroethene (TCE), carbon tetrachloride (CT), chloroform (CF), and methylene chloride (MC).

Benzene, toluene, ethylbenzene, and xylenes (BTEX) are characterized by their toxicity to organisms at higher concentrations. BTEX are volatile and water-soluble constituents that comprise 50% of the water-soluble fraction of gasoline.

Other halogenated compounds include chlorinated pesticides, polychlorinated biphenyls (PCBs) and fluorinated compounds such as Freon, perfluorooctanesulfonic acid (PFOS) and perfluorooctanoic acid (PFOA). PCBs are organochlorine compounds which are mixtures of up to 209 individual chlorinated compounds referred to as congeners. These congener mixtures of chlorobiphenyl (the base chemical) are referred to by different identification systems. PCBs are extremely stable compounds with excellent electrical insulation and heat transfer properties. These characteristics have led to their widespread use in a variety of industrial, commercial and domestic applications. These same properties have rendered them extremely resistant to degradation.

Chemical oxidation is one technology utilized to treat organic contaminants. Oxidants utilized in remediation include hydrogen peroxide ($H_2O_2$). Persulfates ($S_2O_8$) are strong oxidants that have been widely used in many industries for initiating emulsion polymerization reactions, clarifying swimming pools, hair bleaching, micro-etching of copper printed circuit boards, and total organic compound (TOC) analysis. There has been increasing interest in persulfates serving as an oxidant for the destruction of a broad range of contaminants. Persulfates are typically manufactured as sodium, potassium, and ammonium salts. Sodium persulfate ($Na_2S_2O_8$) is the most commonly used for environmental applications. The persulfate anion is the most powerful oxidant of the peroxygen family of compounds and one of the strongest oxidants used in remediation.

The activation of the persulfate can be accomplished using various metals (e.g., iron, manganese, palladium, zinc) in all valence states, ultra violet (UV) light, heat, carbonate, elevated pH, and liquid (hydrogen) peroxide. Each of these activation technologies targets a specific organic range of contaminants. The use of chelated divalent metal complexes to activate persulfate expands the range of contaminants targeted but prevents biological remediation which is a critical step in the remediation process.

Another powerful oxidant, higher-valent tetraoxy iron, such as, Fe(VI)O4(2−), Fe(V) and Fe(VI), commonly referred to as ferrate (VI), has been explored for a broad portfolio of applications, including a greener oxidant in synthetic organic transformations, a water oxidation catalyst, and an efficient agent for abatement of pollutants in soil, sediment and water. Its use as an oxidant/disinfectant and further utilization of the ensuing iron(III) oxides/hydroxide as coagulants of heavy metals and other contaminants are additional attributes of ferrate for chemical oxidation. The multimodal action is a key advantage of using ferrate (VI) over other commonly used oxidants (e.g., chlorine, chlorine dioxide, permanganate, persulfate, hydrogen peroxide, and ozone).

Figure 1:
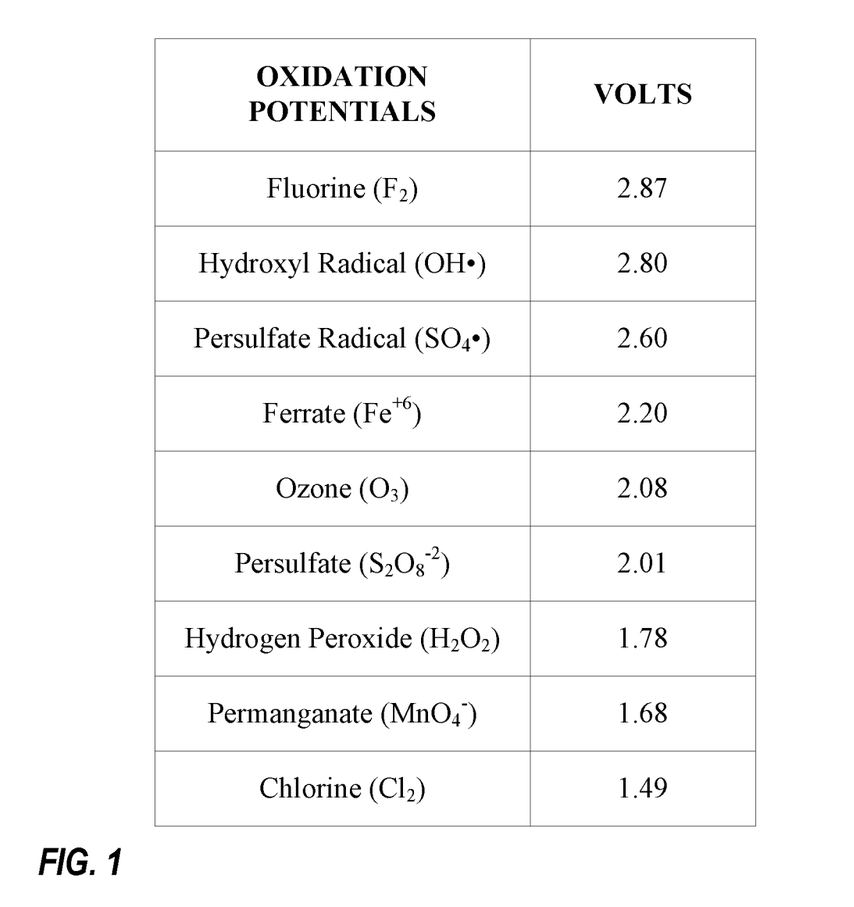
FIG. 1 illustrates rankings of oxidation potentials for various oxidants including ferrate iron ($Fe^{6+}$)

FIG. 1 is a table that shows the oxidation potential of various oxidants. As can be seen, ferrate iron has a higher oxidation potential than many oxidants.

Historically, a wet oxidation method was utilized for generating a ferrate species. The wet oxidation method is multi-step, and pH dependent, requiring liquid and gas feed/mixing systems. The wet oxidation method involves oxidizing a solution containing trivalent iron, Fe(III), with high alkalinity in the presence of concentrated sodium hydroxide (NaOH) for conversion into ferrate (VI). Since the solution containing ferrate (VI) is degraded rapidly, it is necessary to apply sequestration, washing and drying processes for a more stable product.

Several other efforts have been made to produce sodium ferrate (VI). However, there are still many problems in isolating and obtaining dry product from the corresponding solution, due to the high solubility of $Na_2FeO_4$ in the NaOH-saturated solution. For example, the production of potassium ferrate (VI) by another wet oxidation method has been studied since 1950. Here, production of ferrate (VI) initially involved obtaining potassium ferrate from the ferric chloride reaction with sodium hypochlorite (NaClO) in the presence of NaOH which in turn effectuates the sequestration of potassium ferrate from the solution by adding potassium hydroxide. The corresponding reactions are:

$$Fe^{3+} + 3OH^- \rightarrow Fe(OH)_3 \quad \text{(Eq. 1)}$$

$$2Fe(OH)_3 + 3NaClO + 4NaOH \rightarrow 2Na_2FeO_4 + 3NaCl + 5H_2O \quad \text{(Eq. 2)}$$

$$Na_2FeO_4 + 2KOH \rightarrow K_2FeO_4 + 2NaOH \quad \text{(Eq. 3)}$$

Other industrial systems for ferrate generation consist of electrical machines of various size that require significant energy and maintenance. These systems typically produce about 5 to 50 ppm ferrate via a batch process. The produced ferrate in solution is often stored in chilled tanks to prevent rapid loss of reactivity.

More recently, Ma et al. (US Publication 2017/0001878) describe the preparation of ferrate based on "nascent state interface activity". Here, under laboratory conditions (bench-top reaction), they combined an oxidizing agent with iron salt and an alkali solution or particle in water. The aqueous solution was physically mixed and separated by solid-liquid extraction. A ferrate stabilizing material was subsequently added to the resulting liquid which contained ferrate (78 to 98% yield).

The need for support equipment, machinery and energy input to produce ferrate (VI), and its relatively short environmental half-life which requires continuous production and input for sustained treatment processes, are clear disadvantages of utilizing ferrate for ex situ environmental applications.

Hence, a safe and efficacious process for generating ferrate (VI) ex situ, either alone or in conjunction with other oxidants, offers significant benefits in terms of cost, safety and performance. There is a need in the art for a process of oxidation that targets a full range of contaminants in distressed water including drinking water, process water, wastewater, industrial process streams and process waters, municipal process streams and process waters, landfill leachate, sewage/septic systems, and mine effluents.

BRIEF DESCRIPTION OF THE DRAWINGS

The features and advantages of the various embodiments will become apparent from the following detailed description in which.

DETAILED DESCRIPTION

The current remediation process includes utilizing trivalent metals to activate persulfate ($S_2O_8$). The trivalent metals activate the persulfate in order to chemically oxidize a wide range of targeted contaminants and assist in the eventual (over time) biological attenuation of the contaminants. According to one embodiment, the trivalent metal is ferric iron ($Fe^{3+}$). In alternate embodiments, another trivalent metal ion such as manganese (III) or manganic ion ($Mn^{3+}$) may be used. Persulfate activation with ferric iron requires a lower activation energy than thermal activation, which makes iron activated persulfate a more efficient and rapid way of degrading contaminants. The trivalent metals may be applied, either concurrently or sequentially, with the persulfate.

Figure 2:
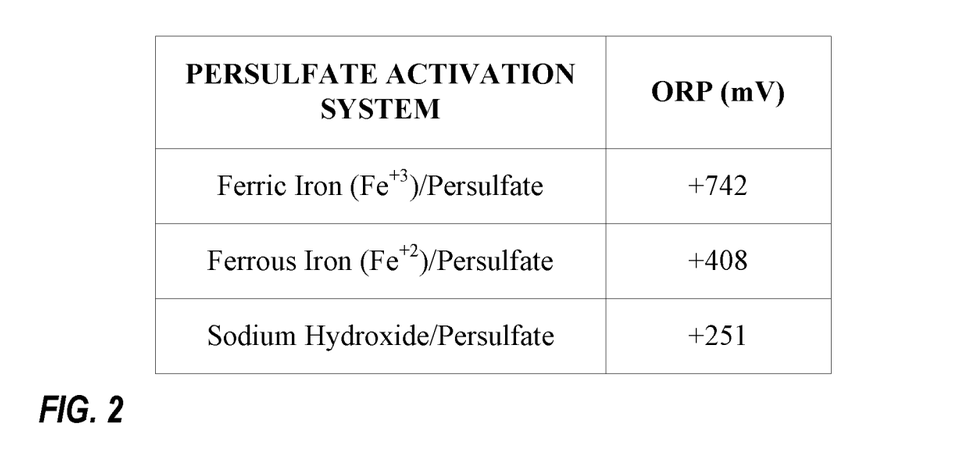
FIG. 2 illustrates rankings of oxidation reduction potential (ORP) for various persulfate activation methods including ferric iron activation.

Trivalent metal activated persulfate also has an increased oxidation reduction potential (ORP) over other activation mechanisms. Laboratory studies were performed to test the changes in ORP upon the activation of persulfate with ferric and ferrous iron species, as well as a caustic activator (NaOH). The experiments were performed at room temperature using deionized (DI) water and a 20% activator to persulfate amount. The materials were mixed for approximately 48 hours and the ORP values were measured. FIG. 2 is table that demonstrates the ferric iron/persulfate system was able to establish higher ORP measurements compared to its other two counterparts.

The contaminants that can be effectively treated with this technology include, but are not limited to, various manmade and naturally occurring volatile hydrocarbons including chlorinated hydrocarbons (e.g., volatile, semi-volatile and non-volatile organic compounds), non-chlorinated hydrocarbons, aromatic or polyaromatic ring compounds, brominated compounds, brominated solvents, 1,4-dioxane, insecticides, propellants, explosives (e.g., nitroaniline trinitrotoluene), herbicides, endocrine disruptors (ECDs) and petrochemicals. Examples of volatile organic compounds include chlorinated olefins such as PCE, TCE, cis-1,2-dichloroethane and vinyl chloride. Examples of non-volatile organic compounds include PCBs and dichlorobenzene. Examples of non-chlorinated compounds include total petroleum hydrocarbons (TPHs) such as benzene, toluene, xylene, methyl benzene and ethylbenzene, methyl tert-butyl ether (MTBE), tert-butyl alcohol (TBA) and polyaromatic hydrocarbons (PAHs) such as naphthalene. Anthropogenic chemicals such as perflourinated compounds, pharmaceutical compounds/endocrine disruptors, pesticides, energetics, and perchlorates can also be potentially oxidized by ferrate.

The activated persulfate effectively oxidizes the targeted contaminant(s) by initially oxidizing the contaminants and then promoting facultative biodegradation (biological remediation) of the contaminants. The introduction of sulfate free radicals allows for a long-lived oxidation, which further extends by utilizing the radical residual and stimulating the biological mineralization of the targeted contaminants.

During the chemical oxidation phase, sulfate free radicals attack the aromatic hydrocarbon bonds of organic compound contaminants. A residual of the oxidization process is sulfate ($SO_4^{2-}$) as evidenced by equation 4. Equations 5-7 show the various persulfates (sodium, potassium, and ammonium) being initially broken down into the appropriate element and persulfate prior to the persulfate breaking down into sulfate.

$$S_2O_8^{2-} + 2e^- \rightarrow 2SO_4^{2-} \tag{Eq. 4}$$

$$Na_2S_2O_8^{2-} \rightarrow 2Na^+ + S_2O_8^{2-} + 2e^- \rightarrow 2SO_4^{2-} \tag{Eq. 5}$$

$$K_2S_2O_8^{2-} \rightarrow 2K^+ + S_2O_8^{2-} + 2e^- \rightarrow 2SO_4^{2-} \tag{Eq. 6}$$

$$(NH_4^+)_2S_2O_8^{2-} \rightarrow 2NH_4^+ + S_2O_8^{2-} + 2e- \rightarrow 2SO_4^{2-} \tag{Eq. 7}$$

In addition to direct oxidation, the activation of the persulfate with the trivalent metal (e.g., ferric iron, $Fe^{+3}$) forms sulfate radicals ($SO_4.^{2-}$) as shown in equation 8. This provides free radical reaction mechanisms similar to the hydroxyl radical pathways generated by Fenton's chemistry. The sulfate radicals are used to further oxidize the contaminants. In addition, the oxidation of the ferric iron should theoretically result in the generation of the highly unstable ferrate species of iron ($Fe^{6+}$) which can more effectively address the targeted contamination. As noted above, the ferrate iron is a transient species that has elevated oxidation potential compared to other oxidants (refer back to FIG. 1).

$$S_2O_8^- + xFe^{3+} \rightarrow xFe^{(4+\ to\ 6+)} + SO_4^{2-} + SO_4.^{2-} \tag{Eq. 8}$$

Ferrate functions both as an oxidant and subsequent coagulant in the form of Fe(III) (hydro)oxides that can immobilize heavy metals. Ferrate also has one of the highest oxidation potentials of any chemical realistically usable in water and wastewater treatment; Eo=2.200 V under acidic conditions, and Eo=0.72 V under basic conditions. Accordingly, the protonated forms of ferrate are the most reactive, but least stable and shorter lived. As such, it can be very beneficial to generate ferrate via a continuous process for ex situ treatment of aqueous streams. The inherent acidity from persulfate reduction (sulfuric acid) can counteract the ferrate chemistry.

Given the high energy required to form ferrate, the use of conventional pH buffering agents (such as magnesium hydroxide) alone are not sufficient to generate ferrate via iron activation (e.g., ferric iron) of persulfate.

Tests were performed to measure the amount of ferrate that was generated for the ferric iron persulfate activation method. The tests were performed by placing persulfate and ferric iron (80:20 ratio) in either deionized water or a phosphate buffer and measuring the amount of ferrate iron generated after 4 hours. The amount generated was basically non-measurable ($<1\times10^{-5}$M).

Basic oxygen furnace (BOF) steel slag is an industrial biproduct with 100% recycled content. The BOF steel slag is a strongly alkaline semi-crystalline solid with high surface area and rich in iron and other inorganic metals that are highly oxidized having been formed at temperatures ranging from 900 to 1,300 degrees Celsius (1,600 to 2,300 degrees Fahrenheit).

Figure 3:
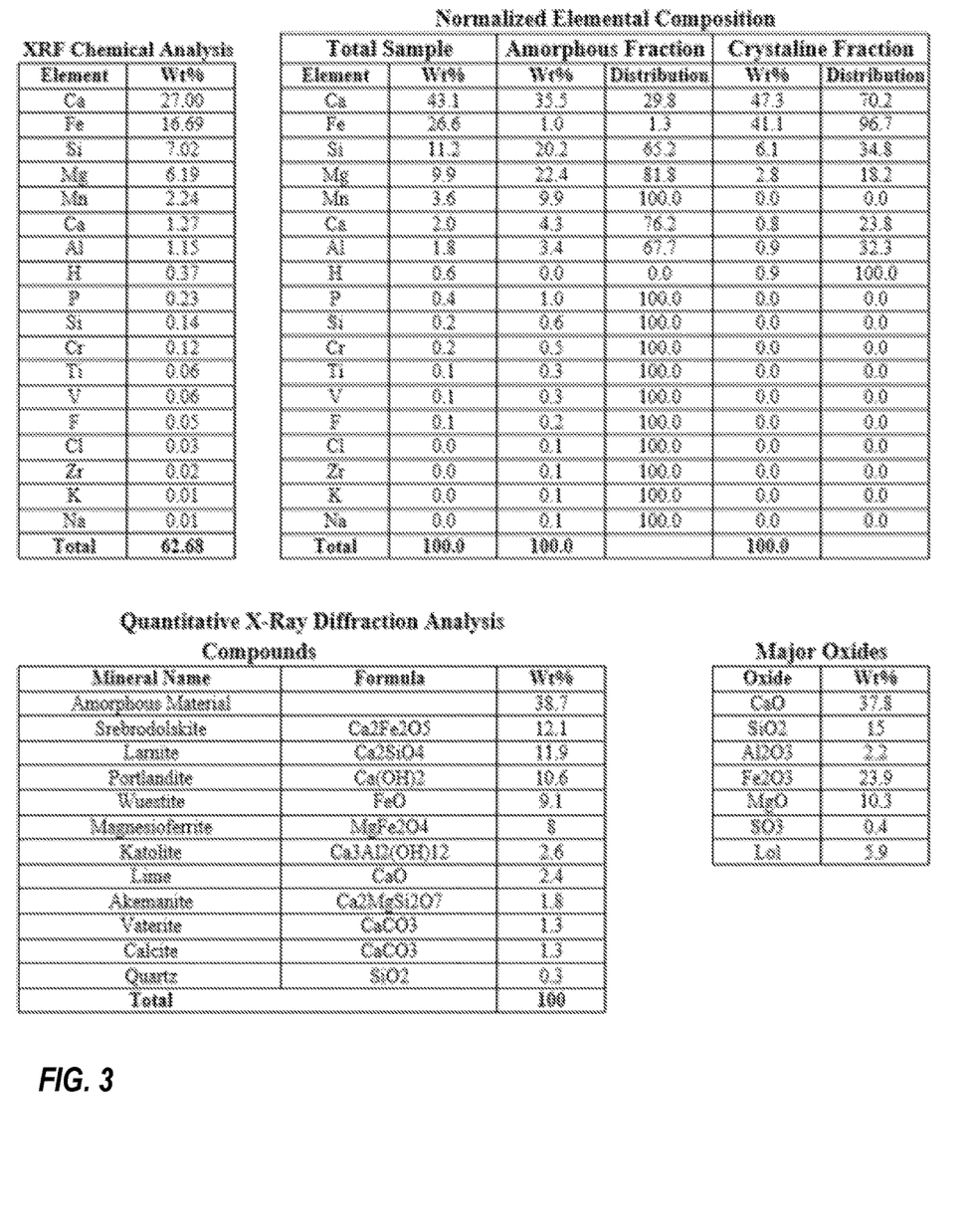
FIG. 3 illustrates a chemical analysis and elemental composition of an example sample of basic oxygen furnace (BOF) steel slag, according to one embodiment.

FIG. 3 illustrates a chemical analysis and elemental composition of an example sample of BOF steel slag. The information was gathered using X-ray fluorescence (XRF), inductively coupled plasma atomic emission spectroscopy (ICP-AES) and Reitveld quantification analysis. As illustrated, the BOF steel slag contains (weight basis) 43.1% calcium (Ca) and 9.9% magnesium (Mg) to provide the alkalinity, 26.6% iron (Fe) and 3.6% manganese (Mn) which are oxidized metals, and 11.2% silicon (Si). These minerals were present as both crystalline and amorphous forms.

Figure 4:
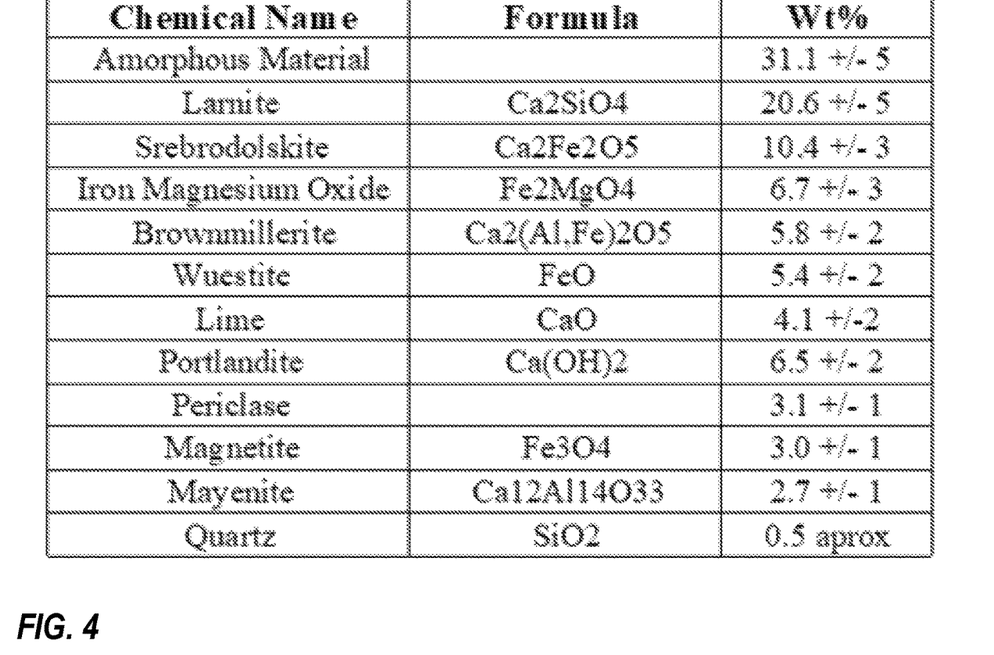
FIG. 4 illustrates a chemical composition of an example blend of BOF steel slag fines, according to one embodiment.

The slag can be crushed, screened and/or milled with metallics removal to produce a desired particle size distribution. FIG. 4 illustrates a chemical composition of an example blend of BOF steel slag fines (e.g., <0.297 mm; US No. 50 sieve). The table illustrates how the percentages of the various chemicals may vary based on different parameters associated with, for example, where the BOF slag came from and how it was processed.

The semi-crystalline BOF steel slag fines are a strongly alkaline and highly geochemically active media with high surface area containing significant amounts of iron and other multivalent cationic oxides and silicates that additionally have metals binding capability. As such, BOF steel slag may uniquely act as a supplemental activator of the persulfate, a catalyst to generate ferrate (VI), and a pH buffer to stabilize the ferrate generated.

The experiment noted above for ferric iron persulfate activation was performed again with approximately 20% of the ferric iron replaced with basic oxygen furnace (BOF) steel slag fines (e.g., slag fines noted in FIG. 4). The second set of tests included placing persulfate, ferric oxide and BOF slag fines (80:16:4 ratio) in either deionized water or a phosphate buffer and measuring the amount of ferrate iron generated after 4 hours. The amount of ferrate generated (approximately between 2.66 to $2.87\times10^{-4}$ M) was over 25 times greater than measured without the BOF steel slag. This computes to a relatively large amount (e.g., 3,000 to 4,000 mg/L) of ferrate during the 4-hour reaction time.

Figure 5:
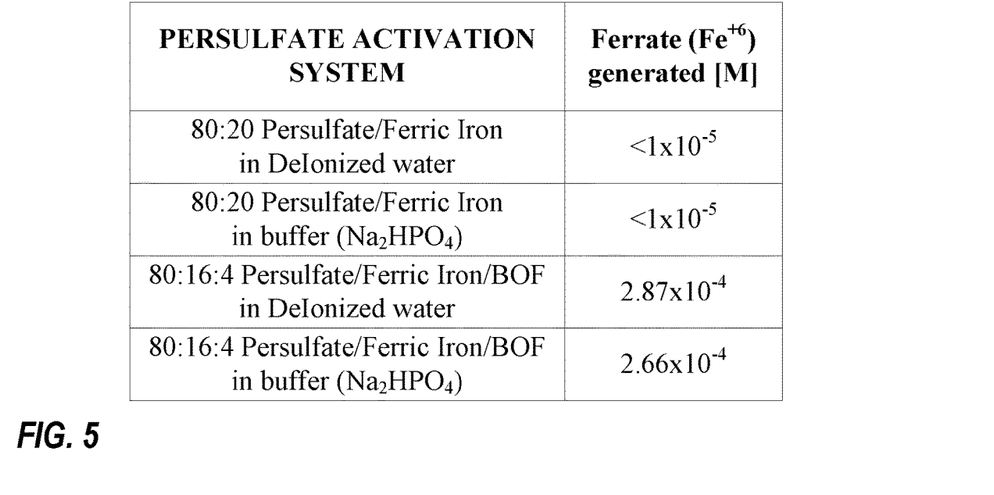
FIG. 5 illustrates amounts of ferrate generated for tests performed for various persulfate activation systems, according to one embodiment.

When the BOF slag fines were used to (co)activate persulfate, the process uniquely and unexpectedly generated measurable ferrate in addition to the standard chemistry associated with persulfate oxidation reactions. Hence, in addition to buffering the reactions, BOF steel slag fines provide the catalytic power to generate ferrate that otherwise would not be formed and operates as a ferrate stabilizer. FIG. 5 illustrates the amount of ferrate generated for the ferric iron persulfate activation systems with and without BOF slag.

As a dry solid reagent, the utilization of BOF steel slag represents a safe, effective, and cost-efficient means of generating ferrate for ex situ remedial applications. It can be used alone or in conjunction with other activators such as additional ferric oxide. These features can provide the catalysis required to generate ferrate (iron (IV), (V), and/or (VI)) when used as described herein.

Ferrate may be generated ex situ within a system where persulfate is activated with a combination of ferric iron (trivalent iron) and BOF steel slag fines as noted above. The ratio of ferric iron to BOF steel slag fines may be the 80:20 ratio noted in the test above but is in no way limited thereto. For example, according to one embodiment the activator may simply be BOF steel slag fines as they contain a significant amount of iron. The BOF steel slag may be blended with other iron species (e.g., ferric iron). The ex situ generation includes a persulfate solution flowing therethrough or thereover an activator (e.g., some combination of iron and/or BOF steel slag) within, for example, a column, filter, fluidized bed or continuously stirred tank reactor (CSTR). The ex situ generation will produce a leachate that contains multiple reactive oxidant species (ROS) such as hydrogen peroxide ($H_2O_2$), superoxide (O2.), sulfate radicals, hydroxyl radicals (OH.) and—uniquely—ferrate species including Fe IV, V and VI. These ROS will destroy organic compounds, sterilize, and can oxidize inorganics.

Figure 6A:
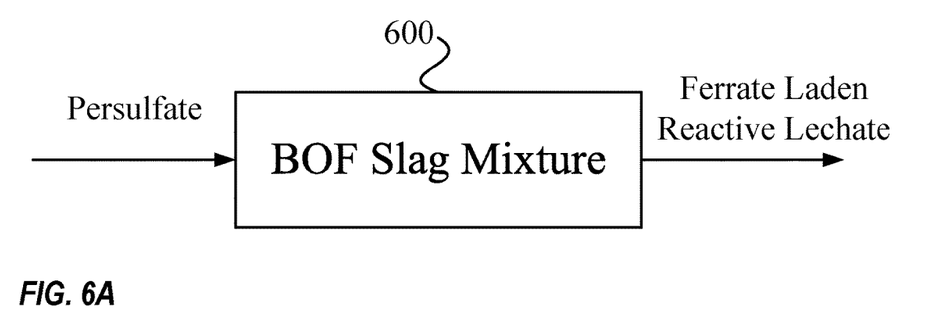
FIGS. 6A-C illustrate example ex situ systems for generating ferrate, according to various embodiments.
Figure 6B:
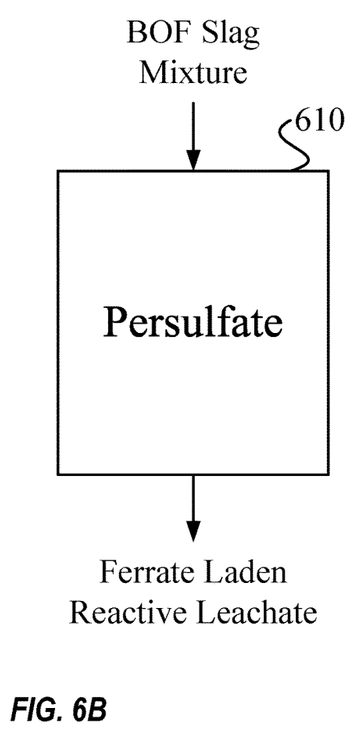
Figure 6C:
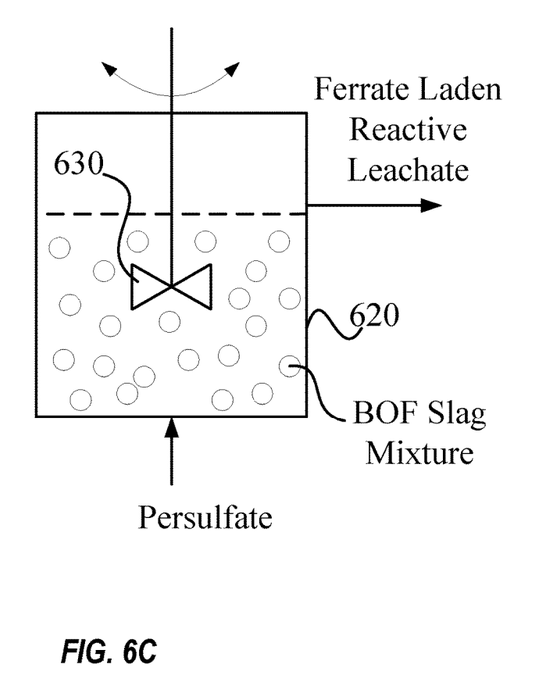

FIGS. 6A-C illustrate example ex situ systems for generating ferrate. FIG. 6A illustrates an example column system. The system includes a container 600 of BOF steel slag mixture (to provide a column of the BOF steel slag mixture). The BOF steel slag mixture includes BOF steel slag fines and possibly additional iron (e.g., trivalent iron). A persulfate solution is provided to one side of the container 600 in order to flush the persulfate through the column of the BOF steel slag mixture. A reactive leachate exits a second end of the container 600. As noted above, the reactive leachate includes ferrate along with hydroxyl radicals, sulfate radicals, superoxides etc.

FIG. 6B illustrates an example fluidized bed system. The system includes a container 610 filed with a persulfate solution. A BOF steel slag mixture is then provided to the container 610 to activate the persulfate solution. A ferrate laden reactive leachate is created and exits a bottom of the container 610.

FIG. 6C illustrates an example CSTR system. The system includes a container 620 having an auger 630 for rotating the contents therein. The container 620 may be filled with a BOF steel slag mixture. The BOF steel slag mixture may be provided in a fluid within the container 620. For ease of illustration the BOF steel slag mixture within the fluid is illustrated as circles. A persulfate solution is provided to the bottom of the container 620. A ferrate laden reactive leachate is created and exits a side of the container 620 (at or above the level of the BOF steel slag mixture).

The various ex situ ferrate generators (e.g., FIGS. 6A-C) may be permanently located or may be mobile. The systems may be operated in close proximity to where the ferrate laden reactive leachate (ferrate and other materials) produced may be utilized. The system may be continuously operated so that ferrate may continuously be generated ex situ. Alternatively, the system may be operated when ferrate is desired.

The ferrate laden reactive leachate may be provided to, for example, distressed water (e.g., drinking water, process water, wastewater, industrial process streams, bilge waters, drilling fluids and process waters, municipal process streams and process waters, landfill leachate, sewage/septic systems, bilge waters, drilling fluids, mine effluents) to destroy organic contamination, disinfect, remove color and remove odor. The ferrate laden reactive leachate may be utilized as part of a pre treatment process, treatment process or post treatment process.

The ferrate laden reactive leachate may be provided for treatment of various soil and soil-like media including contaminated soils, sediments, clays, rocks, sands and the like (hereinafter collectively referred to as "soils"), contaminated groundwater (i.e., water found underground in cracks and voids of soil, sand and rocks), and aquifers. The ferrate laden reactive leachate may be used alone or in conjunction with other activators such as additional ferric oxide to enable secondary bioremediation processes. The ferrate laden reactive leachate may be easily and safely introduced to the subsurface environment via direct mixing, hydraulic fracturing, pneumatic fracturing, and direct push injection of slurries. Other application processes are hereby incorporated.

Figure 7:
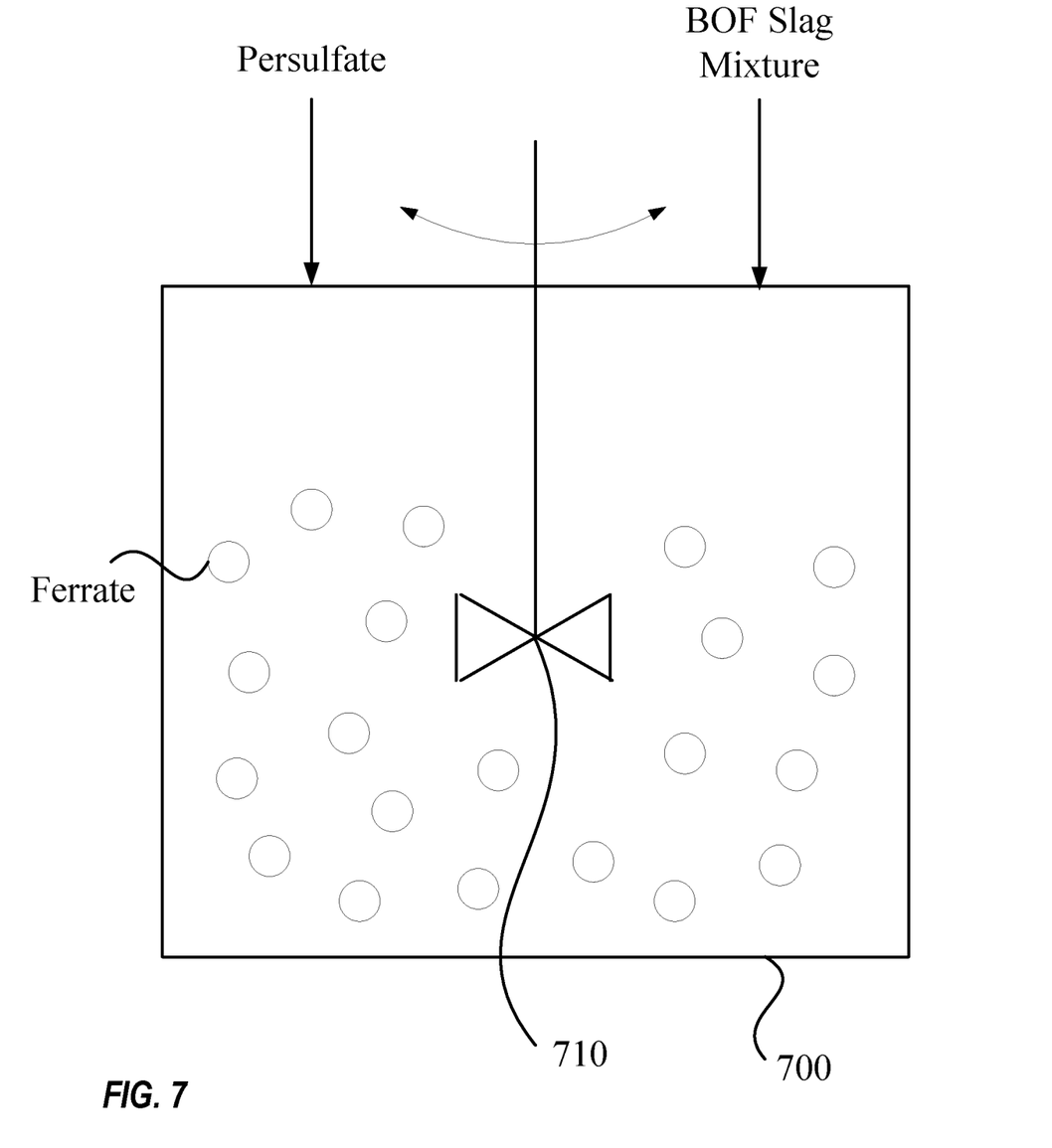
FIG. 7 illustrates an example waste treatment system where ferrate is generated therewithin, according to one embodiment.

According to one embodiment, the ferrate may be generated in an actual treatment system (e.g., waste water, sewage) by providing both the persulfate and the BOF steel slag mixture to the system. The persulafe is activated by the BOF steel slag mixture within the system and produces the ferrate laden reactive leachate (ferrate and other materials) therewithin. FIG. 7 illustrates an example waste treatment system where ferrate is generated therewithin. The system includes a container 700 filled with waste. The container 700 includes an auger 710 for rotating the contents (e.g., waste, treatments) therein. Persulfate and a BOF steel slag mixture may be added to the container and may interact within the container to create the ferrate. For ease of illustration, the ferrate generated with the waste is simply illustrated as circles.

According to one embodiment, one or more of the generator systems may be able to form the ferrate by flushing other oxidants over the BOF steel slag and possibly other iron species. The other oxidants may include, for example, hydrogen peroxide.

There are significant differences between this embodiment and other known processes for making ferrate, such as those discussed in the background. These include: i) the ability to continuously generate and stabilize ferrate ex situ via a single step process; ii) the use of BOF steel slag avoids the need for additional pH buffers and ferrate stabilizers; iii) the use of only dry solid reagents that are easily settleable; and iv) the reagent (BOF steel slag) being an industrial byproduct comprised of recycled materials instead of a specialized reagent. These factors represent significant advancements in terms of simplicity, cost, ease of use, flexibility and/or sustainability.

Figure 8:
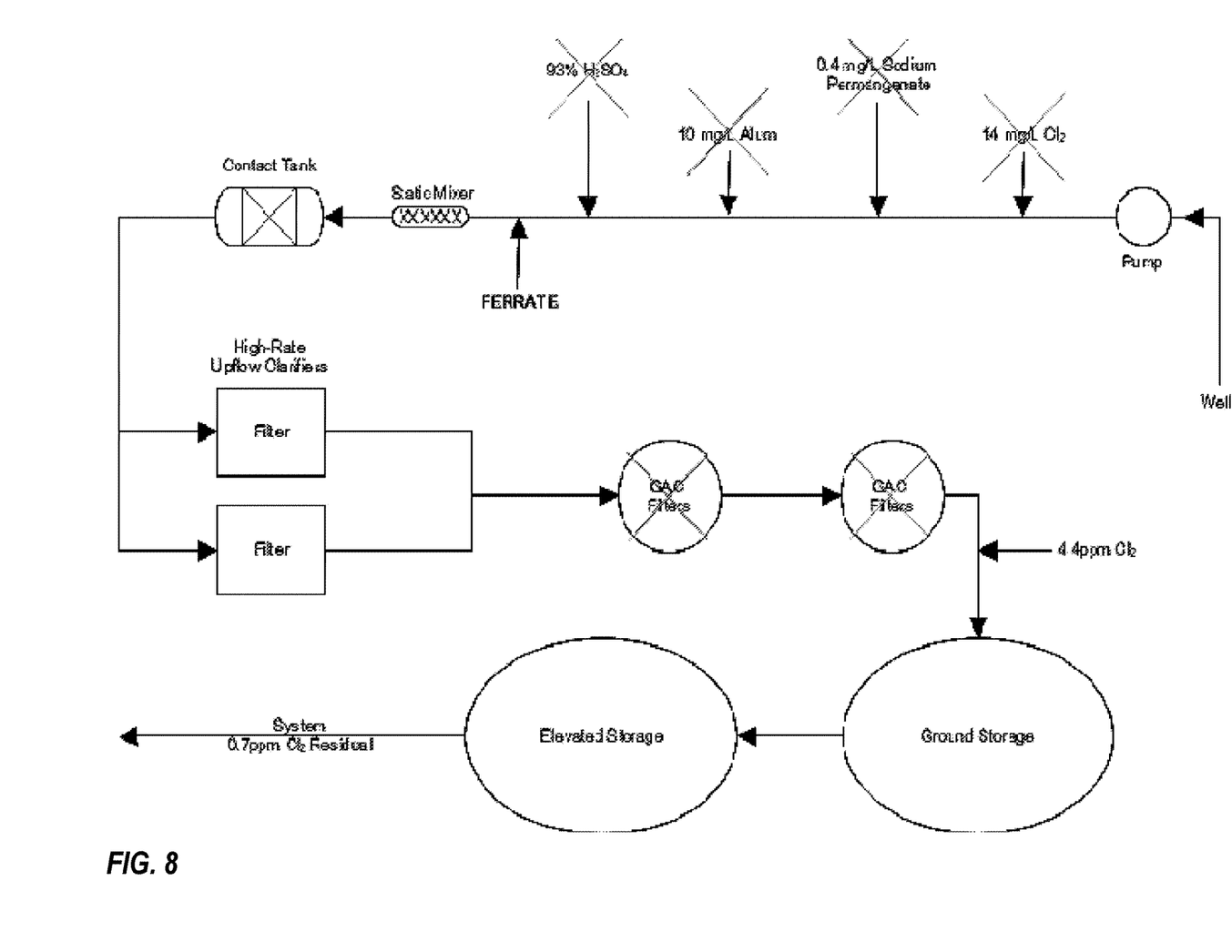
FIG. 8 illustrates example modifications to an example drinking water system when ex situ generated ferrate is added to the system, according to one embodiment.

The use of the reactive leachate (ferrate and other materials) may simplify a waste treatment system by reducing and/or eliminating the need for various chemicals, additives, solutions or the like to be provided to the system and/or to reduce and/or eliminate various filters, scrubbers or the like to be utilized by the system. FIG. 8 illustrates example modifications to an example drinking water system when ex situ generated ferrate is added to the system. As illustrated, when ferrate is added to the water retrieved from a well various solutions that are typically provided to the water may not be required. Furthermore, certain filters may be removed from the system. The drinking water system is simplified based on the ferrate generated ex situ being provided thereto.

Persons skilled in the art will appreciate that the concept, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A method for generating ferrate ex situ, the method comprising:
    introducing a basic oxygen furnace (BOF) steel slag mixture and an oxidant liquid together in a container, wherein the BOF slag co-activates the oxidant liquid, generates the ferrate from iron and stabilizes it through pH buffering.

2. The method of claim 1, wherein the oxidant liquid is persulfate.

3. The method of claim 1, wherein the oxidant liquid is hydrogen peroxide.

4. The method of claim 1, wherein the BOF steel slag mixture includes iron.

5. The method of claim 1, further comprising providing the ferrate to one or more of drinking water, process water, wastewater, industrial process streams/waters, municipal process streams/waters, landfill leachate, sewage/septic systems, bilge waters, drilling fluids and mine effluents.

6. The method of claim 5, wherein the ferrate is used to remove odor, color, inorganic and/or organic contaminants from the one or more of drinking water, process water, wastewater, industrial process streams/waters, municipal process streams/waters, landfill leachate, sewage/septic systems, bilge waters, drilling fluids and mine effluents.

7. The method of claim 5, wherein the ferrate is for disinfecting the one or more of drinking water, process water, wastewater, industrial process streams/waters, municipal process streams/waters, landfill leachate, sewage/septic systems, bilge waters, drilling fluids and mine effluents.

8. The method of claim 5, wherein the ferrate is to reduce biofouling for the one or more of drinking water, process water, wastewater, industrial process streams/waters, municipal process streams/waters, landfill leachate, sewage/septic systems, bilge waters, drilling fluids and mine effluents.

9. The method of claim 1, wherein the container is a filter that the BOF steel slag mixture is provided therein as a column and the oxidant fluid is flowed thereover the column.

10. The method of claim 1, wherein the container is a fluidized bed that houses the oxidant fluid and the BOF steel slag mixture is added thereto.

11. The method of claim 1, wherein the container is a continuously stirred tank reactor (CSTR) that houses the BOF steel slag mixture within a fluid and the oxidant liquid is added thereto.

12. The method of claim 1, wherein the method is performed in a permanent or a mobile system.

13. The method of claim 1, wherein the container is a selected from a continuously stirred tank reactor (CSTR), a filter format/configuration, or a fluidized bed.

14. The method of claim 1, wherein the container is housing one or more of drinking water, process water, wastewater, industrial process streams/waters, municipal process streams/waters, landfill leachate, sewage/septic systems, bilge waters, drilling fluids and mine effluents.

15. The method of claim 1, wherein hydroxyl radicals, sulfate radicals, and/or superoxide is generated in addition to the ferrate.

16. The method of claim 1, wherein the BOF steel slag is an industrial biproduct.

17. The method of claim 1, wherein the BOF steel slag includes recycled content.

18. A method for generating ferrate, the method comprising:
providing BOF steel slag and at least one iron species in a container; and
introducing a persulfate liquid to the container, wherein the BOF steel slag and the at least one iron species co-activates the persulfate liquid, generates the ferrate and stabilizes it through pH buffering.

19. The method of claim 18, further comprising providing the ferrate to one or more of drinking water, process water, wastewater, industrial process streams/waters, municipal process streams/waters, landfill leachate, sewage/septic systems, bilge waters, drilling fluids and mine effluents.

20. The method of claim 18, wherein the container is a selected from a continuously stirred tank reactor (CSTR), a filter format/configuration, or a fluidized bed.

* * * * *